United States Patent [19]
Karlowitz

[11] 3,776,212
[45] Dec. 4, 1973

[54] METHOD FOR EMISSION CONTROL FOR SPARK IGNITION ENGINES

[76] Inventor: Bela Karlowitz, 1510 Scenery Ridge Dr., Pittsburgh, Pa. 15241

[22] Filed: Oct. 22, 1970

[21] Appl. No.: 83,163

Related U.S. Application Data

[63] Continuation of Ser. No. 798,716, Feb. 12, 1964, abandoned.

[52] U.S. Cl. ..... 123/191 SP, 123/32 ST, 123/32 SP, 123/32 SA, 123/30 D, 123/32 C
[51] Int. Cl. ............................................. F02b 19/00
[58] Field of Search ............... 123/32, 32 ST, 32 SP, 123/191, 32 C, 32 E

[56] References Cited
UNITED STATES PATENTS

| | | | |
|---|---|---|---|
| 3,406,667 | 10/1968 | Evans | 123/143 A |
| 2,173,081 | 9/1939 | Barkeij | 123/191 SP |
| 2,121,920 | 6/1938 | Mallory | 123/32 ST |
| 2,153,618 | 4/1939 | Fischer | 123/32 |
| 2,156,665 | 5/1939 | Mallory | 123/32 ST |
| 2,753,852 | 7/1956 | Beller | 123/32 |
| 2,758,576 | 8/1956 | Schlamann | 123/32 ST |
| 3,092,088 | 6/1963 | Goossak et al. | 123/32 UX |
| 3,283,751 | 11/1966 | Goossak et al. | 123/32 |
| 3,304,922 | 2/1967 | Hideg | 123/32 |
| 2,173,081 | 9/1939 | Barkeij | 123/191 SP |
| 1,825,658 | 10/1931 | Dumanois | 123/32 E |

OTHER PUBLICATIONS

SAE Journal 11–63 pages 60–63.

*Primary Examiner*—Laurence M. Goodridge
*Attorney*—Webb, Burden, Robinson & Webb

[57] ABSTRACT

Method and apparatus for operating internal combustion spark ignition engines in a manner to reduce the harmful constituents of the exhaust of the engine. The engine is operated, except during peak power requirement, with very lean air-fuel mixtures. The loss of power generally accompanied by lean air-fuel mixtures due to slow burning is avoided by supplying turbulence of proper intensity to the burning mixture. The turbulence is supplied by constructing a combustion chamber divided into main and auxiliary sections joined by an orifice. By selecting the proper orifice size and the proper ratio of the volumes of the main and auxiliary sections sufficient turbulence can be provided to burn the lean air-fuel mixture within normal crank angles.

16 Claims, 1 Drawing Figure

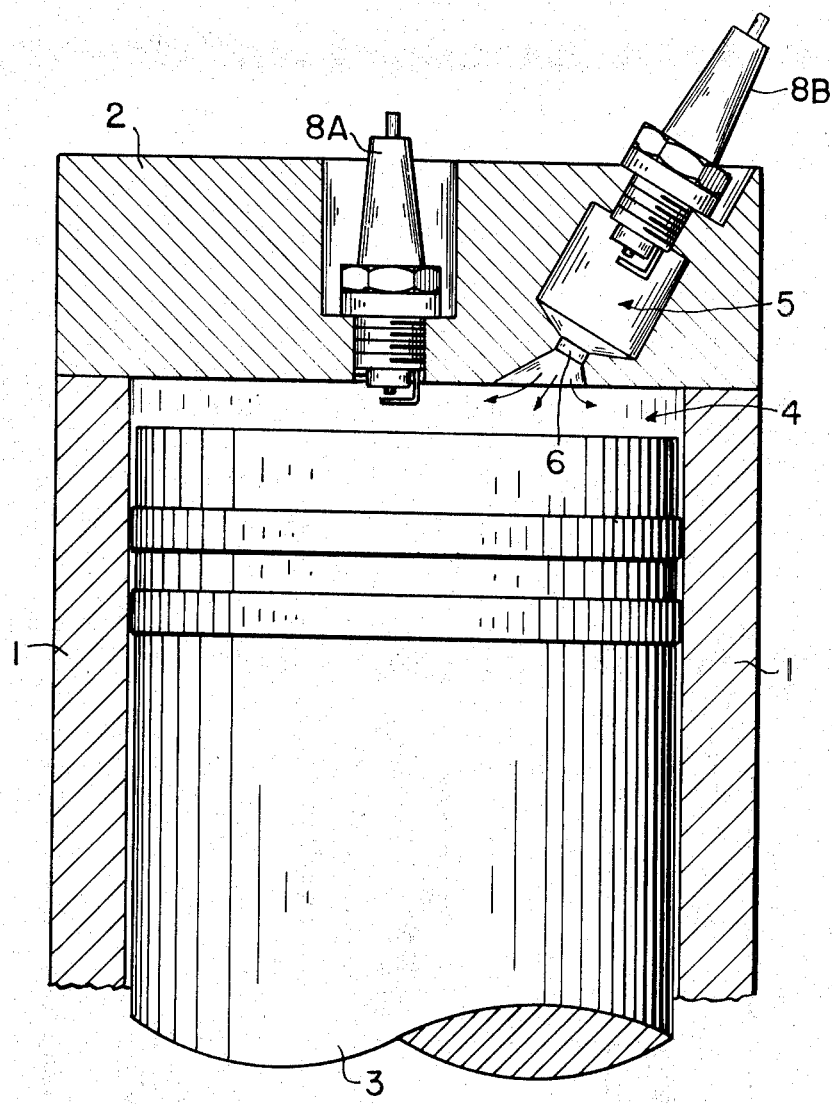

METHOD FOR EMISSION CONTROL FOR SPARK IGNITION ENGINES

This application is a continuation of Ser. No. 798,716, filed Feb. 12, 1969, now abandoned.

BACKGROUND

The permissible limits of the emissions and the ultimate goals which go beyond the legal limits are shown in the following tabulation:

|  | HC ppm | CO % | NO ppm |
| --- | --- | --- | --- |
| Present standard | 275 | 1.5 | 350 |
| 1970 standard | 180 | 1.0 | 350 |
| Ultimate Objectives | 65 | 0.5 | 175 |

These values are the averages measured in a standardized test program simulating city driving conditions.

To reduce the average CO content of the exhaust gas below 0.5 percent it is sufficient to operate the engine with an air-fuel ratio of about 16. Such slightly lean mixtures burn quite rapidly in present day engines and are satisfactory except when peak power is required. This use presents no difficulties if the intake system can deliver a uniform mixture to the cylinders. However, the reduction of the NO content of the exhaust to acceptable levels requires much leaner mixtures, for example mixtures with air-fuel ratio of about 18 to 20.

In present spark ignition engines combustion of the charge in the cylinder requires about 50° to 60° of crank angle for faster burning mixtures, and about 90° for slower burning lean mixtures with an air-fuel ratio in excess of about 16. The long combustion time causes power losses because of the motion of the piston during the combustion period. For very lean mixtures torque and efficiency of the engine decrease by an unacceptable 10 to 20 percent or more and the engine performance becomes sluggish. The long combustion time also allows sufficient time for self-ignition of part of the highly compressed charge (knocking combustion) unless the fuel possesses sufficient anti-knock additives which may also be pollutants.

According to this invention, combustion is sufficiently accelerated so that the engines can operate most of the time with very lean mixtures without loss of power. However, during peak power operation near stoichiometric mixture is required unless the size of the engine is greatly enlarged. Since peak power operation contributes only a few percent of the total engine exhaust, the use of near stoichiometric mixtures during peak power operation is permissible without serious overall effect on the emissions.

Operation of engines according to this invention with very lean mixtures becomes possible without loss of power or efficiency by generating the proper intensity of turbulence in the combustion chamber during the combustion period. Thereby combustion is so accelerated that it can be completed within a 60° to 30° crank angle. The intensity of turbulence required for this purpose is less, but not very much less, than the turbulence intensity which the flame can tolerate without being quenched.

It is known that the time required for combustion is strongly affected by turbulence. Indeed, the present day spark ignition engines make good use of turbulence. Various schemes are used to generate turbulence by the displacement of the charge by the piston or by the inflow velocity of the charge. However, because turbulence decays very rapidly for the purposes of this invention, it must be generated when it is required.

Turbulence has an additional beneficial effect besides shortening the time of combustion. There is a thin layer of combustible mixture next to the walls of the combustion chamber and in the crevices between the piston and cylinder wall, which is not consumed by the passing flame because the flame is quenched in the vicinity of the wall. Sufficient turbulence will mix this combustible film with the burning gas or hot combustion products. The film is thereby ignited and burned. Thus, the amount of unburned hydrocarbons in the exhaust gas is substantially reduced. During peak power operation of spark ignition engines near stoichiometric air-fuel mixtures are required. These mixtures generally must contain anti-knock additives to prevent engine knock. However, by generating the proper intensity of turbulence, these mixtures can be burned rapidly enough to reduce or eliminate these additives. Hence, it is possible according to this invention to operate an internal combustion spark ignition engine during both normal and peak power periods so the exhaust emissions contain little, if any, lead or other anti-knock chemicals which are very undesirable pollutants.

THE INVENTION

According to this invention an internal combustion spark ignition engine having at least one cylinder and piston defining a combustion chamber is operated at most conditions with very lean air-fuel mixtures, for example in excess of 18:1. The combustion chamber is divided into main and auxiliary sections with an orifice therebetween. During operation, the combustible mix is fed to the cylinder in any of the conventional ways. The combustible mixture is then compressed by the movement of the piston. Part of the mixture is forced through the orifice into the auxiliary chamber creating great turbulence therein. The mixture is then ignited with sparks of an electrode (the timing of ignition being according to well known principles). As will be more fully explained, the electrodes may be located in the main section of the combustion chamber or in the auxiliary section. Due to the turbulence in the auxiliary section of the chamber the air-fuel mixtures burn very rapidly causing a rapid rise in pressure. The gases in the auxiliary section then rush through the orifice into the main section causing turbulence therein. The size of the orifice and the ratio of the volumes of the main and auxiliary sections are selected so that the combustion products rushing out of the auxiliary section provide sufficient turbulence to the main section to cause total burning within an acceptable crank angle, usually 60°, yet not such strong turbulence to quench the flame. The volume of the auxiliary section should be from 3 to 15 percent and preferably from 8 to 12 percent of the compression volume in order to provide sufficient energy for turbulence generation. The auxiliary section will typically be 10 percent by volume of the compression volume for the most satisfactory results. The orifice size is partially determined by the amount of turbulence required. The orifice size is also controlled by the conditions necessary for passing a flame through an orifice. If, for example, ignition is provided in the auxiliary section the orifice must be sufficiently large enough to allow the flame to pass out of the auxiliary section. On the other hand, if ignition is in the main section of the combustion chamber the orifice must be sufficiently large to permit a flame to pass into the auxiliary section. Engines operated according to this invention burn very lean air-fuel mixtures without power loss except during rapid acceleration at which times stoichiometric mixtures must be used. The use of very lean mixtures and strong turbulent mixing results in very low emission of NO, CO and unburned hydrocarbons in the engine exhaust.

Furthermore, engines operated according to this invention may burn fuel with little, if any, anti-knock additives resulting in very low undesirable emissions of lead or other anti-knock chemicals. In this case, the size of the orifice and the ratio of the volumes of the main and auxiliary sections are further selected to create turbulence of sufficient intensity to burn stoichiometric air-fuel mixtures within about a 30° crank angle. One of the discoveries upon which this invention is predicated is that an orifice size and a ratio of volumes between the main and auxiliary sections can be selected to satisfy the requirements of normal operation on lean air-fuel mixtures and to satisfy the requirements of peak power operation on near stoichiometric air-fuel ratios.

The drawing is a schematic section view of an internal combustion spark ignition cylinder and piston.

DETAILED DESCRIPTION

In a spark ignition engine, the charge in the cylinder after compression consists of vaporized fuel mixed with air. The combustion reaction in such mixture occurs in a very thin combustion wave which propagates into the unburned mixture. Due to turbulence this combustion wave is wrinkled and very large combustion wave area is packed into a small volume. The reaction rate per unit volume is proportional to the total area of the combustion wave, therefore, the change is consumed in a short time interval by the turbulent flame.

THE INTENSITY OF TUBULENCE REQUIRED

The combustion wave propagating in a combustible mixture is characterized by the propagation velocity of the wave, denoted as burning velocity $S_u$; and by the thickness of the combustion wave $\eta_o$. The ratio of these quantities ($\eta_o/S_u$) is the characteristic time of the combustion wave ($t_1$). Thickness of the combustion wave and burning velocity are connected by the relationship.

$$\eta_o = \lambda/c_p \, \sigma \, S_u$$

where
$\lambda$ heat conductivity of the unburned mixture 18 cal/cm°C sec
$c_p$ specific heat of the unburned mixture cal/g°C
$\sigma$ density of the unburned mixture g/cm³

Turbulence is characterized by the root means square value of the random fluctuating velocities, usually called the intensity of turbulence, $u'$, and by the average size of the random eddies called the scale of turbulence $l$. The ratio of these two quantities ($l/u'$) is the characteristic time of turbulence (T).

Turbulent motion continually stretches the area of a randomly wrinkled combustion wave existing in a turbulent combustible medium, while burnout of the combustible mixture eliminates combustion wave area. Theoretical calculations and experience shows that the time required to complete combustion in a turbulent medium is approximately twelve times the characteristic time, that is, $$\Delta t = 12 \, l/u'$$

Hence, the time required for combustion may be reduced by increasing the intensity of turbulence. On the other hand, the shortest permissible time is limited by the requirement that the characteristic time of turbulence shall not be shorter than the characteristic time of the combustion wave. That is, the charactertistic number $$\eta_o/S_u \cdot u'/l$$

must be smaller than a critical value, which is in the order of one. If the characteristic number approaches its critical value then the combustion wave breaks apart due to rapid stretching and the flame is quenched by the combustible mixture.

EXAMPLE I

Numerically in a typical engine with a compression ratio of 10:1 operated on a very lean air-fuel mixture ($A/F = 20$) the following numerical values may be assumed:
$S_u = 20$ cm/sec
$\sigma = 9.2 \times 10^{-3}$ g/cm³
$c_p = 0.24$ cal/g°C
$\lambda = 0.6 \times 10^{-4}$ cal/cm°C sec
Hence,
$\eta_o = \lambda/c_p \, \sigma \, S_u = (0.6 \times 10^{-4})/(0.24 \times 9.2 \times 10^{-3} \, 20)$
$= 0.136 \times 10^{-2}$ cm
The characteristic time of the combustion wave, and the shortest permissible characteristic time of turbulence is therefore
$t_1 = (\eta_o/S_u) \, (0.136 \times 10^{-2})/(20) = 0.68 \times 10^{-4}$ sec $= (l/u')$ minimum Operation of the engine with such very lean mixtures ($A/F = 20$) becomes possible without power loss if combustion is accomplished within approximately 45° crank angle. At 3,000 RPM the time interval available for combustion is
$\Delta t = (45/360) \, (60/3000) = 2.5 \times 10^{-3}$ second
The characteristic time of turbulence required to complete combustion in this time interval is
$T = \Delta t/12 = (2.5 \times 10^{-3}/12) = 2.1 \times 10^{-4}$ sec
Clearly, the required turbulence intensity is well below the permissible limit. Therefore, it is possible to burn a very lean mixture of $A/F = 20$ within 45° crank angle, even at 3,000 RPM, if the proper amount of turbulence is introduced into the mixture.

EXAMPLE II

In the same engine referred to in Example I, burning a near stoichiometric mixture with $S_u = 40$ cm/sec and $\eta_o = 0.068 \times 10^{-2}$, the characteristic time of the combustion wave is
$t_1 = \eta_o/S_u = (0.068 \times 10^{-2}/40) = 0.17 \times 10^{-4}$ sec $= (l/u') \, min$ It is desirable to burn the near stoichiometric mixtures during full power operation in approximately 30° crank angle to reduce the anti-knock requirements of the fuel. At 3,000 RPM the time interval available for combustion is
$\Delta t = (30/360) \, (60/3000) = 1.66 \times 10^{-3}$ second
The required characteristic time of turbulence is therefore
$T = \Delta t/12 = (1.66 \times 10^{-3})/(12) = 1.4 \times 10^{-4}$ sec.
This is less than the characteristic time of the combustion wave, therefore, the turbulence intensity required to complete combustion in the desired short time interval is substantially below what the flame can safely tolerate.

ROUGH BURNING

Fast combustion can cause engine roughness if the rate of pressure rise exceeds 50 psi degree of crank angle. However, combustion of a stoichiometric mixture in an engine with 10:1 compression ratio within 30° crank angle would produce only about 44 psi per degree, if the development of pressure is smooth. With turbulence generation by an independent mechanism, like the jet issuing from the pod, there will be a smooth pressure rise.

Furthermore, it is very likely that engine roughness depends not so much on the rate of pressure rise than on the shape of the pressure curve. Slow decline of the burning rate during the latter part of the combustion seems to be beneficial for smooth operation. As the jet from the auxiliary section ceases to operate when about half of the charge is consumed, a slow decline in the burning rate is to be expected.

GENERATION OF TURBULENCE

Turbulence is generated by feeding energy into large size eddies, which in turn drive smaller and smaller eddies. In steady state, or quasi-steady state, the scale of turbulence, $l$, is determined by the geometry of the system and is proportional to some characteristic dimension of the system. It may be assumed to be approximately constant even though the intensity of turbulence, $u'$, may vary in wide limits.

The rate of energy absorption per unit mass of the turbulent medium is $$\epsilon = \frac{d\epsilon}{dt} = \frac{3\left(\frac{u'^2}{2}\right)}{l/u'} \text{ or also } \frac{3/2 l^2}{T^3}$$

where $\epsilon$ is the kinetic energy of turbulent motion per unit mass of the medium and $\epsilon$ is the rate of energy dissipation. Without continued energy input the kinetic energy of the turbulent motion, $3(u'^2/2)$ is reduced by the factor $1/e = 0.367$ in a time interval of $T = l/u'$. This shows that at the very short characteristic times required for rapid combustion, turbulence cannot be introduced into the charge much ahead of the combustion period. Turbulence must be generated when it is needed.

The energy absorption equation above also shows that in the case where turbulence is sustained by continued energy input, the characteristic time varies inversely with the one-third power of the energy input rate; that is, the resulting characteristic time is not very sensitive to the energy input rate. Large variation of the energy input rate will only slightly affect the resulting characteristic time of turbulence which is required for combustion control. This circumstance is very advantageous, because exact control of the rate of energy input into turbulence generation is not possible under the variable operating conditions of a piston engine.

Turbulent flames themselves generate turbulence by the differential acceleration of randomly mixed burned and unburned gas masses. The intensity of turbulence generated by this mechanism is dependent on the geometry of the confinement of the flame. In a piston engine this process is manifested by the fact that stronger mixtures, which have a larger expansion ratio on combustion, burn faster than leaner mixtures. This effect plays an important part in the combustion process of present day engines, however, it is not strong enough to produce the desired shorter combustion times.

One way to generate the required strong turbulence during the combustion process is to have a small auxiliary section, chamber, or combustion pod in communication with the main combustion chamber of the cylinder through an orifice.

Referring now to FIG. 1, the combustion chamber is shown defined by cylinder walls 1, cylinder head 2 and a piston 3. The section is such that intake and exhaust valves are not shown. The main section 4 of the combustion chamber is connected with an auxiliary section or combustion pod 5 by an orifice 6. Ignition electrodes (spark plugs) are shown in alternate positions. (Of course, only one electrode is used in each combustion chamber.) Electrode 8A is positioned to ignite a combustible mixture in the main combustion section. In this instance, the electrode is placed adjacent the orifice 6. Electrode 8B is shown positioned within the combustion pod.

During the compression stroke fresh combustible mixture is pushed into the pod through the orifice. The velocity through the orifice can be calculated from the following formula:

$$U = U_p (A_p/A) (V_1/V_2)$$

where
$U =$ Flow velocity through the orifice
$U_p =$ Piston speed
$A_p =$ Area of piston
$A =$ Area of orifice
$V_1 =$ Volume of pod (constant)
$V_2 =$ Cylinder volume above the piston (variable)

The kinetic energy of the stream entering the pod is rapidly converted into turbulence, so that at the time of ignition by the spark, which may be in the main section of the combustion chamber of the cylinder or in the pod, the mixture in the pod is highly turbulent motion. If the spark is in the main section of the combustion chamber, that is, outside of the pod, the flame is carried into the pod by the inflowing stream of burning mixture. In the highly turbulent mixture in the pod combustion is very rapid. Shortly after ignition the pressure in the pod exceeds the pressure in the cylinder and a high velocity burning jet is ejected into the combusion chamber. This jet spreads the flame out over the volume of the combustion chamber and generates the turbulence necessary for the rapid completion of combustion. During the fast pressure rise in the combustion chamber the pressure differential across the orifice is again reversed, and the pod acts as a damper against pressure fluctuations. During the expansion stroke and at the time of the opening of the exhaust valve, the pressure in the pod is higher than in the cylinder and again a jet issues from the orifice. This jet entrains and mixes the contents of the cylinder and facilitates thereby the burning of the quenched fractions of the mixtures.

The total energy available for turbulence generation is proportional to the volume of the pod and to the expansion ratio of the burned and unburned gas. It is, therefore, larger for richer mixtures than for leaner mixtures. This is advantageous because richer mixtures must burn faster to avoid self-ignition and engine knock.

The rate at which the energy for turbulence generation is delivered is dependent on the initial turbulence intensity in the pod. The rate of energy delivery and turbulence intensity therefore increases with increasing engine RPM, as required.

The required volume of the pod may be estimated from the total energy requirement for turbulence generation over the entire combustion period.

EXAMPLE III

For example, in an engine with 10:1 compression ratio, 3.88 inches bore, 3.0 inches stroke operating with a lean mixture ($A/F = 20$) at 3000 RPM and allowing 45° crank angle, for combustion the time interval for combustion is $\Delta t = 2.5 \times 10^{-3}$ sec
the required characteristic time of turbulence $T = 2.1 \times 10^{-4}$ sec
the scale of turbulence $l = 0.2$ cm
the required intensity of turbulence $u' = 1000$ cm/sec
the rate of turbulent energy dissipation $\epsilon = 0.71 \times 10^{10}$ erg/g sec
the mass of the charge in the cylinder $M = 0.7$ gram
the total energy required to maintain the turbulence level during combustion $Q = 125 \times 10^5$ erg·

At $U = 26,000$ cm/sec jet velocity (a typical velocity) the total mass flow required of the jet becomes $G = 0.036$ gram, which is 5 percent of the mass of the charge in the cylinder. Only about one-half of the gas contained in the pod can escape before the pressure in the pod and in the cylinder are equalized. The required volume of the pod is therefore about 10 percent of the compression volume, or 6 cm³. The orifice area is calculated from the volume flow rate and the assumed velocity of the jet. This gives an area of $A = 0.1$ cm² and with a flow coefficient of 0.5 an orifice diameter of 0.5 cm.

For a given pod volume and orifice area the actual velocity of the jet, and the energy available for turbulence generation, will depend on the rate of combustion in he pod. It is not possible to predict exactly the burning rate in the pod. However, for every engine type the jet velocity and the intensity of turbulence generated by the jet can be adjusted experimentally by variation of the orifice size. A small orifice produces higher inflow velocity into the pod and, therefore, faster combustion. It also increases the velocity of the outflowing jet. Larger orifice reduces the burning rate in the pod and also the velocity of the jet. By proper adjustment of the orifice area it is possible to generate the turbulence intensity which is sufficient for the desired short combustion time of the charge, but which is safely below the permissible limit.

At lower engine speeds, the flow velocities, burning rates, turbulence intensity, etc. change approximately linearly with the RPM. Therefore, the crank angle required for combustion remains approximately constant.

EXAMPLE IV

Operating the same engine described in Example III with a stoichiometric mixture with $S_u = 40$ cm/sec at 3,000 RPM and allowing 30° crank angle for combustion $\Delta t = 1.66 \times 10^{-3}$ sec
$T = 1.4 \times 10^{-4}$ sec
$l = 0.2$ cm
$u' = 1,400$ cm/sec
$\epsilon = 2 \times 10^{10}$ erg/g sec
$Q = 230 \times 10^5$ erg
$U = 32,000$ cm/sec (the jet velocity is higher than for lean mixtures because of higher temperature rise on combustion)
$m = 0.045$ gram or 6.4 percent of the charge M The 6 cm³ pod volume is again sufficient, because of the larger expansion ratio of the mixture on combustion.

Since the engine described in this example can be operated so that combustion is substantially complete within a 30° crank angle, it is necessary to add little, if any, anti-knock additives to the fuel.

PASSING THE FLAME THROUGH THE ORIFICE

The diameter of the orifice must be such that if the spark is in the compression space of the cylinder the flame can pass through the orifice into the pod at the jet velocity which is generated by the compression stroke of the piston. Conversely, if the spark is in the pod, the orifice diameter must be large enough to allow the flame to pass through the orifice at the jet velocity generated by combustion of the mixture contained in the pod.

Under static conditions, that is, where there is no flow through an orifice, a flame can propagate through an opening if the diameter of the opening is larger than the quenching distance, which is a characteristic property of the combustible mixture. The quenching distance in stoichiometric air-fuel mixtures is quite small even at atmospheric pressure and it is inversely proportional to the absolute pressure. For example, for stoichiometric propane-air mixtures the quenching distance is 0.19 cm at atmospheric pressure. Consequently, under static conditions flames can pass through very small openings particularly at high pressures.

The conditions for the passage of a flame are very different if a pressure differential exists across the orifice by which a jet is produced. In this case the flame can move only wit the flow and not against the flow. Furthermore, the flame must pass through the region of high turbulence intensity produced by the jet. The criterion for the survival of the flame is the same as in any other highly turbulent medium, that is, the characteristic time of the combustion wave, $\eta_o/S_u$, must be smaller than the characteristic time of turbulence, $T = l/u'$. In the critical region where the laminar core of the jet flow becomes entirely turbulent the characteristic time of turbulence generated by the jet is $T = \alpha(d_o/U_o)$ where $d_o$ is the orifice diameter
$U_o$ is the flow velocity at the orifice
$\alpha$ is a numerical factor in the order of 1 to 2, the value of which is dependent on the flow conditions around the jet.

Therefore, the orifice size is limited by the following equation:

$$d \geq (\eta_o U_o)/(S_u \alpha)$$

For the case where ignition is in the main section of the combustion chamber and the flame must be carried into the auxiliary chamber the velocity of the jet carrying the flame can be calculated from the formula described above, that is $$U = U_p (A_p/A) \cdot (V_1/V_2)$$

EXAMPLE V

In an engine with a 3 inch stroke, 10:1 compression ratio, at 3,000 RPM and 20° BTDC $U_p = 415$ cm/sec
$V_2 = 78$ cm$^3$
$V_1 = 6$ cm$^3$ (pod volume)
$A_p = 76$ cm$^2$
$A = 0.2$ cm$^2$ (0.5 cm orifice)
$U = 415\ (76/0.2)\ (6/78) = 12,000$ cm/sec $= 120$ m/sec Assuming also that $\eta_o/S_u = 0.68 \times 10^{-4}$ sec (as calculated in Example I) and $\alpha = 2$.

Therefore, substituting into the formula $$d \geq (\eta_o/S_u)(U_o/\alpha)$$
$$d \geq (0.68 \times 10^{-4} \times 1.2 \times 10^4)/2 = 0.408 \text{ cm}$$

Hence, a 0.5 cm orifice is sufficient to allow the flame to pass through at the desired lean mixture.

MIXING DURING EXPANSION

During the expansion stroke the pressure in the pod is always somewhat above the pressure in the cylinder. The jet which issues from the pod mixes the contents of the cylinder. Thereby the cold unburned fractions of the charge are mixed with the hot combustion products and burned. The velocity of the jet issuing from the pod is again calculated from the formula $$U = U_p (A_p/A)(V_1/V_2)$$

For example, at 3,000 RPM and 90° after top dead center the velocity of the jet is 8,000 cm/sec. Later, when the exhaust valve opens and the pressure in the cylinder drops rapidly, the jet velocity approaches sound velocity for a short time. If the engine is operated with lean mixtures, and never with mixtures richer than stoichiometric, it is to be expected that the thorough mixing of the gases in the cylinder during the expansion and exhaust phase by the jet will remove the unburned hydrocarbons from the exhaust almost entirely.

Having thus described my invention with the particularity required by the patent law, what is desired to be protected by Letters Patent is set forth in the following claims.

What I claim as my invention is:

1. A method of operating an internal combustion spark ignition engine having at least one cylinder and reciprocating piston therein defining a combustion chamber, said combustion chamber divided into main and auxiliary sections, said auxiliary section being in communication only with said main section, there being an orifice between the main and auxiliary section sized to pass a flame and promote turbulence such that the harmful exhaust emissions including CO, NO and unburned hydrocarbons are substantially reduced comprising the steps for, A. introducing only a very lean combustible mixture having an air-fuel ratio of at least 18:1 only to the main section of the combustion chamber;

B. compressing the combustible mixture in the main section of the combustion chamber and thereby forcing part of the mixture through the orifice into the auxiliary section creating great turbulence therein;

C. igniting the combustible mixture within the combustion chamber from a single ignition source:

D. causing a very rapid rise in pressure in the auxiliary section due to the rapid burning caused by the turbulence therein; and E. causing the combustion products of the auxiliary section to escape through the orifice into the main section creating sufficient turbulence therein to cause substantially total burning within a 60° crank angle.

2. A method according to claim 1 wherein the combustible mixture is ignited in the main section and the flame is carried into the auxiliary section by the combustible mixture being forced therein, the size of the orifice being selected such that the flame will not be quenched by the turbulence generated by the jet passing into the auxiliary section.

3. A method according to claim 1 wherein the combustible mixture is ignited in the auxiliary section and the flame is carried into the main section by the combustion products forced out of the auxiliary section, the size of the orifice being selected such that the flame will not be quenched by the turbulence generated by the jet passing into the main section.

4. A method according to claim 1 wherein the diameter of the orifice between the main and auxiliary sections is equal to or larger than $\eta_o V_o/S_u \alpha$ cm where $\eta_o$ is the thickness of the combustion wave in cm, $S_u$ is the speed of the combustion wave in cm/sec, $V_o$ is the speed cm/sec of the jet carrying the flame into the nonignited section and $\alpha$ is the numerical factor on the order of 1 to 2, the value of which is dependent on the flow conditions around the jet.

5. A method according to claim 1 wherein the volume of the auxiliary section is between 3 and 15 percent of the total compression volume.

6. The method according to claim 1 wherein the volume of the auxiliary section is between 8 and 12 percent of the total compression volume.

7. A method according to claim 1 wherein the volume of the auxiliary section is typically 10 percent of the compression volume.

8. A method of operating an internal combustion spark ignition engine having at least one cylinder and reciprocating piston therein defining a combustion chamber, said combustion chamber divided into a main and auxiliary section, said auxiliary section being in communication only with said main section, there being an orifice between the main and auxiliary section sized to pass a flame and promote turbulence such that harmful exhaust emissions including CO, NO and unburned hydrocarbons are substantially reduced during normal operation and such that harmful exhaust emissions comprising anti-knock additives are substantially eliminated comprising the steps during normal operation for A. introducing only a very lean combustible mixture having an air-fuel ration of at least 18:1 only to the main section of the combustion chamber;

B. compressing the combustible mixture in the main section of the combustion chamber and thereby forcing part of the mixture through the orifice into the auxiliary section creating great turbulence therein;

C. igniting the combustible mixture within the combustion chamber from a single ignition source;

D. causing a very rapid rise in pressure in the auxiliary section due to the rapid burning caused by the turbulence therein; and E. causing the combustion products of the auxiliary section to escape through the orifice into the main section creating sufficient turbulence therein to cause substantially total burning within a 60° crank angle, and comprising the steps during peak power operation for A. introducing a combustible mixture having an air-fuel ratio of approximately stoichiometric and very minor, if any, amounts of anti-knock additives to the main section of the combustion chamber;

B. compressing the combustible mixture in the combustion chamber and thereby forcing a part of the mixture through the orifice in the auxiliary section creating great turbulence therein;

C. igniting the combustible mixture within the combustion chamber;

D. causing a very rapid rise in pressure in the auxiliary section due to rapid burning caused by turbulence therein; and E. causing the combustion products of the auxiliary section to escape through the orifice into the main section creating sufficient turbulence therein to cause substantially total burning within a 30° crank angle.

9. In an internal combustion spark ignition engine that minimizes harmful exhaust emissions including CO, NO and unburned hydrocarbons, at least one cylinder and reciprocating piston therein defining a combustion chamber, there being only one spark plug per cylinder, means for dividing the combustion chamber into the main and auxiliary sections, said auxiliary section being in communication with only said main section; said dividing means defining an orifice between the sections, means for introducing a very lean combustible mixture only to the main section of the combustion chamber, the ratio of the volume of the main and auxiliary sections and the size of the orifice selected such that during the compression cycle part of the combustible mixture of fuel and air rushes into the auxiliary section causing great turbulence therein and after ignition the combustion products rush out of the auxiliary section into the main section causing turbulence therein sufficient to provide combustion of a very lean air-fuel mixture having an air-fuel ratio of at least 18:1 that is substantially total within a 60° crank angle, the size of said orifice further selected sufficiently large such that the burning jet passed therethrough into the nonignited section will not be quenched by excessive turbulence.

10. An internal combustion engine according to claim 9 wherein the ratio of the volumes of the main and auxiliary sections and the size of the orifice are further selected such that during peak power operation of the engine sufficient turbulence is created in the main section to provide combustion of a near stoichiometric air-fuel mixture that is substantially total within a 30° crank angle.

11. An engine according to claim 9 wherein electrodes of the spark plug are provided in the auxiliary section for causing ignition.

12. An engine according to claim 9 wherein electrodes of the spark plug are provided in the main section for causing ignition.

13. An engine according to claim 9 wherein the diameter of the orifice between the main and auxiliary sections is equal or larger than $(\eta_o V_o)/(S_u \alpha)$ cm where $\eta_o$ is the thickness of the combustion wave in cm, $S_u$ is the speed of the combustion wave in cm/sec, $V_o$ is the speed cm/sec of the jet carrying the flame into the nonignited section and $\alpha$ is a numerical factor on the order of 1 to 2, the value of which is dependent on the flow conditions around the jet.

14. An engine according to claim 9 wherein the volume of the auxiliary section is between 3 and 15 percent of the total compression volume.

15. An engine according to claim 9 wherein the volume of the auxiliary section is between 8 and 12 percent of the total compression chamber.

16. An engine according to claim 9 wherein the volume of the auxiliary section is typically 10 percent of the compression volume.

* * * * *

UNITED STATES PATENT OFFICE
CERTIFICATE OF CORRECTION

Patent No. 3,776,212      Dated December 4, 1973

Inventor(s) Bela Karlovitz

It is certified that error appears in the above-identified patent and that said Letters Patent are hereby corrected as shown below:

>Under the heading entitled Related U. S. Application Data, --February 12, 1964-- should read --February 12, 1969--. Column 1 Line 22 --This-- should read --Their--. Column 3 Line 36 --change-- should read --charge--. Column 3 Line 51 --18 cal/cm°C sec-- should read --cal/cm°C sec--. Column 5 Line 6 --psi degree-- should read --psi per degree--. Column 7 Line 49 --he-- should read --the--. Column 8 Line 52 --wit-- should read --with--.

Signed and sealed this 16th day of April 1974.

(SEAL)
Attest:

EDWARD M. FLETCHER, JR.
Attesting Officer

C. MARSHALL DANN
Commissioner of Patents